US008424400B2

(12) United States Patent
Zakharov

(10) Patent No.: US 8,424,400 B2
(45) Date of Patent: Apr. 23, 2013

(54) CRANK-AND-ROCKER PISTON MACHINE

(76) Inventor: Evgeny Nikolaevich Zakharov, Moscovskaya oblast (RU)

( * ) Notice: Subject to any disclaimer, the term of this patent is extended or adjusted under 35 U.S.C. 154(b) by 165 days.

(21) Appl. No.: 12/998,367

(22) PCT Filed: Oct. 13, 2009

(86) PCT No.: PCT/RU2009/000535

§ 371 (c)(1),
(2), (4) Date: Apr. 13, 2011

(87) PCT Pub. No.: WO2010/044700

PCT Pub. Date: Apr. 22, 2010

(65) Prior Publication Data

US 2011/0197691 A1 Aug. 18, 2011

(30) Foreign Application Priority Data

Oct. 14, 2008 (RU) ................................ 2008140446

(51) Int. Cl.
*F16H 21/16* (2006.01)

(52) U.S. Cl.
USPC ..................... 74/25; 123/197.4; 74/27; 74/29

(58) Field of Classification Search ................ 74/25, 60; 123/52.1, 53.6, 197.1, 197.2, 197.4
See application file for complete search history.

(56) References Cited

U.S. PATENT DOCUMENTS 508,387 A * 11/1893 Humphries ....................... 74/32
2,312,057 A 2/1943 Williams
4,270,395 A * 6/1981 Grundy ............................. 74/49
4,395,977 A * 8/1983 Pahis ......................... 123/197.4
4,534,272 A * 8/1985 Irwin .............................. 91/493

(Continued)

FOREIGN PATENT DOCUMENTS

RU 2 126 890 2/1999
SU 1 065 626 1/1984

OTHER PUBLICATIONS

International Search Report.

*Primary Examiner* — David M Fenstermacher
(74) *Attorney, Agent, or Firm* — Collard & Roe, P.C.

(57) ABSTRACT

The invention relates to mechanical engineering, in particular to piston machines and mechanisms for converting the movement of the pistons thereof into shaft rotation. The technical result of the invention involves increasing the operational reliability, extending the service life, improving the specific mass and dimensional characteristics and enhancing the efficiency of a machine. The essence of the invention is that the piston and the crank of a piston machine are interconnected by means of a hinged joint with at least a flat hinge which enables the piston to self-center along the cylinder surface owing to the movement of the piston with respect to the crank in any direction on a plane that intersects the longitudinal axis of the cylinder. Side bearing elements are mounted on the interacting parts of the body and the crank; furthermore, the connection between the opposite parts of the crank and the coupling elements is designed in such a way that the movement of one part of the crank with respect to the opposite part thereof is limited in the direction away from the axis of rotation of the shaft along the reciprocating motion of the crank in order to ensure a specified distance between the contact surfaces of the working bearing elements of the crank when the machine is in operation. Furthermore, a preliminary load is created between the contacting surfaces of the working bearing elements and rollers.

8 Claims, 5 Drawing Sheets

U.S. PATENT DOCUMENTS 4,685,342 A * 8/1987 Brackett ........................... 74/50
5,351,567 A * 10/1994 Brackett ........................... 74/49
5,546,821 A 8/1996 Brackett
5,546,897 A 8/1996 Brackett
5,560,327 A * 10/1996 Brackett ...................... 123/55.7
5,575,173 A * 11/1996 Brackett ........................... 74/49
5,640,881 A * 6/1997 Brackett ........................... 74/49
7,201,133 B2 * 4/2007 McKeown ................. 123/197.1
7,878,081 B2 * 2/2011 Sundheim ......................... 74/50
7,958,864 B2 * 6/2011 Sturman ....................... 123/321
8,109,737 B1 * 2/2012 Gamble et al. ................ 417/397

* cited by examiner

CRANK-AND-ROCKER PISTON MACHINE

CROSS REFERENCE TO RELATED APPLICATIONS

This application is the National Stage of PCT/RU2009/000535 filed on Oct. 13, 2009, which claims priority under 35 U.S.C. §119 of Russian Application No. 2008140446 filed on Oct. 14, 2008, the disclosure of which is incorporated by reference. The international application under PCT article 21(2) was not published in English.

FIELD OF THE INVENTION

The invention relates to the sphere of machine building, in particular to the piston machines and mechanisms converting piston reciprocation into shaft rotation.

BACKGROUND ART

As it is known there exists a crank-and-rocker piston machine consisting of a housing accommodating a crankshaft with a crank which mounts, through a bearing, a slide block; the work surfaces of the slide block interact with the surfaces of the rocker linked to a piston reciprocating inside a cylinder secured to the machine housing, while the interacting surfaces of the block and rocker are made as flat friction couples (Ref. I. I. Artobolevsky, *Mechanisms in Current Technology*, Volume 2, p. 23, Moscow, Nauka, 1979).

The disadvantages of the known machine are low operational reliability of the sliding friction couples due to impossibility to provide a steady fluid layer between contact surfaces during their mutual reciprocation, unfavorable conditions of interaction between the rocker and block contact surfaces due to insufficient rigidity of the rocker work surface resulting from the rocker considerable dimensions in the direction perpendicular to the piston movement, increased radial dimensions of the machine due to distancing the cylinder from the shaft rotational axis resulting, as is said above, from the rocker large dimension in the lateral direction, and increased friction losses due to unfavorable coincidence of the minimum relative speed of interacting surfaces of the rocker and block with the maximum mechanical exposure within the interface, in particular, when the machine is used as an internal combustion engine.

As is known there exists a crank-and-rocker piston machine consisting of a housing accommodating a crankshaft with a crank which mounts, through a bearing, a slide block; the work surfaces of the slide block interact with the surfaces of the rocker linked to a piston reciprocating inside a cylinder secured to the machine housing, while the slide block is made as a rotating sleeve (Ref. U.S. Pat. No. 5,546,897, Aug. 20, 1996).

The operating conditions of the slide block moving over the rocker surface, while being better than sliding of surfaces in the traditional rocker mechanism, however require a guaranteed clearance to be ensured between the block surface and rocker surface in the direction opposite to action of the operating force to prevent considerable friction losses when the block slides relative to the said rocker surface. Presence of a clearance results in decreased reliability and life of the machine due to occurrence of impacts between the contact surfaces and due to inevitable phenomenon of the block slipping relative to the surface contacting therewith. It is also noteworthy, that the slipping phenomenon always occurs when use is made of friction couples which movement is not synchronized relative to the surface contacting therewith.

As is known there exists a crank-and-rocker piston machine consisting of a housing accommodating a crankshaft with a crank which mounts, through a bearing, a slide block; the work surfaces of the slide block interact with the surfaces of the rocker linked to a piston reciprocating inside a cylinder secured to the machine housing, while the slide block is made as a rotating sleeve with projections and cavities of a complex spatial outlines synchronized with the position and form of the mating projections and cavities on the rocker surfaces alternatively interacting therewith (Ref. U.S. Pat. No. 5,546,821, Aug. 20, 1996).

Presence of projections and cavities in the interacting surfaces of the rocker and rotating slide block make it possible to decrease relative slipping of the interacting surfaces during the machine operation, however, the disadvantage of this solution consists in the complexity of ensuring the shape and dimensions of the contact surfaces, and unreliable operation, especially at extreme points of the slide block, when the contact is transferred from one surface of the rocker to its opposite surface.

The technical solution being the closest to the claimed one is a crank-and-rocker piston machine which consists of a housing accommodating a crankshaft with one crank mounting, through a bearing, a slide block (slider); the opposite (relative to the crankpin bearing rotation direction) work surfaces of the slide block interact with the respective work surfaces located on the rocker parts being opposite relative to the crankpin bearing rotation axis, with the rocker linked to pistons reciprocating inside opposite cylinders secured to the machine housing, where the machine is provided with lateral support elements with contact surfaces which translate to the housing the reactive torque and represent a cylinder and a piston, where the interacting work surfaces of the slide block and rocker bear operating support elements with contact surfaces and toothed racks, where the space between the contact surfaces of the operating support elements of the slide block and rocker accommodates support rollers provided with synchronizing toothed wheels which are engaged with the racks of the operating support elements of both the rocker and slide block, where the opposite parts of the rocker which surfaces bear the operating support elements are interconnected by means of longitudinal connecting elements, the length of the contact surface of the slide block support element being equal to the length of the contact surface of the rocker support element and the length of the contact surface to be determined as a distance in the slide block motion plane between the extreme points of the surface area translating the force action in the slide block-rocker couple (Ref. U.S. Pat. No. 2,312,057, Feb. 23, 1943).

The disadvantages of the known machine are its low reliability and short life due to increased requirements to high accuracy of manufacture dictated by the design, which is practically unachievable during series production. It requires absolute coincidence of the axes of opposed cylinders and arrangement of all cylinder axes in one plane. High dimensional accuracy of connecting elements is required to ensure perpendicularity of contact surfaces of the cylinders axis, and besides, perpendicularity of the crankshaft to the plane in which axes of all cylinders are arranged must be ensured.

SUMMARY OF THE INVENTION

The technical result of the claimed invention is increased operational reliability of the machine, extended life, optimized weight and size parameters and higher efficiency.

According to the invention, the claimed objective may be achieved by the fact that in the crank-and-rocker piston machine, which consists of a housing accommodating a crankshaft with at least one crank mounting, through a bearing, a slide block (slider), its opposite (relative to the crankpin bearing rotation direction) work surfaces interacting with the respective work surfaces located on the rocker parts being opposite relative to the crankpin bearing rotation axis, where the rocker is linked to at least one piston reciprocating inside a cylinder secured to the machine housing, while the machine is provided with lateral support elements with contact surfaces which translate to the housing the reactive torque, where the interacting work surfaces of the slide block and rocker bear operating support elements with contact surfaces and toothed racks, where the space between the contact surfaces of the operating support elements of the slide block and rocker accommodates support rollers provided with synchronizing toothed wheels which are engaged with the racks of the operating support elements of both the rocker and slide block, where the opposite parts of the rocker which surfaces bear the operating support elements are interconnected by means of longitudinal connecting elements, the length of the contact surface of the slide block support element being equal to the length of the contact surface of the rocker support element and the length of the contact surface to be determined as a distance in the slide block motion plane between the extreme points of the surface area translating the force action in the slide block-rocker couple, the piston and rocker are interconnected by means of a hinge assembly, accommodating at least a flat hinge, to allow the piston self-alignment along cylinder surface due to travel in any direction relative to the rocker in the plane crossing the cylinder longitudinal axis; the lateral support elements are mounted to interacting parts of the housing and rocker, the crankpin bearing provides for angular travel of the slide block in the plane crossing the shaft rotational axis and for slide block travel along the shaft rotational axis to allow self-alignment of the slide block relative to the crank, where the coupling between opposite parts of the rocker and connecting elements is made so as to limit travel of one rocker part relative to its opposite part towards the direction opposite to the shaft rotational axis and along the rocker reciprocation to ensure the desired distance between the contact surfaces of the rocker operating support elements during the machine operation, while making the contact surfaces of operating support elements and rollers preloaded.

The claimed objective is also achieved by making the connecting elements as one piece with opposite parts of the rocker which bear the operating support elements or as separate links connected to opposite parts of the rocker which bear the operating support elements.

The claimed objective is also achieved by equipping at least one support element with a mechanism for adjusting its spatial position to make, as a minimum, the place of contact between the support rollers and contact surfaces of operating support elements preloaded.

The claimed objective is also achieved by providing the lateral support elements with toothed racks and accommodating in-between the contact surfaces of lateral support elements support rollers equipped with synchronizing toothed wheels engaged with the toothed racks of lateral support elements, where at least one lateral support element, for example that installed on the housing, is provided with a mechanism to adjust its spatial position to ensure, at a minimum, a pre-interference in the interacting contact surfaces of the support elements and rollers.

The claimed objective is also achieved by additionally equipping the hinge assembly with a spherical hinge enabling the piston to change the tilt angle of its longitudinal axis relative to the direction of the rocker reciprocation.

The claimed objective is also achieved by making the machine double-cylinder, where each opposite part of the rocker is connected to the piston, or four-cylinder, with intersecting axes of cylinder pairs, with the slide block having two pairs of opposite o surfaces.

BRIEF DESCRIPTION OF THE DRAWINGS

The claimed invention is explained by means of the following drawings:

THE BEST EMBODIMENT OF THE INVENTION

Figure 1:
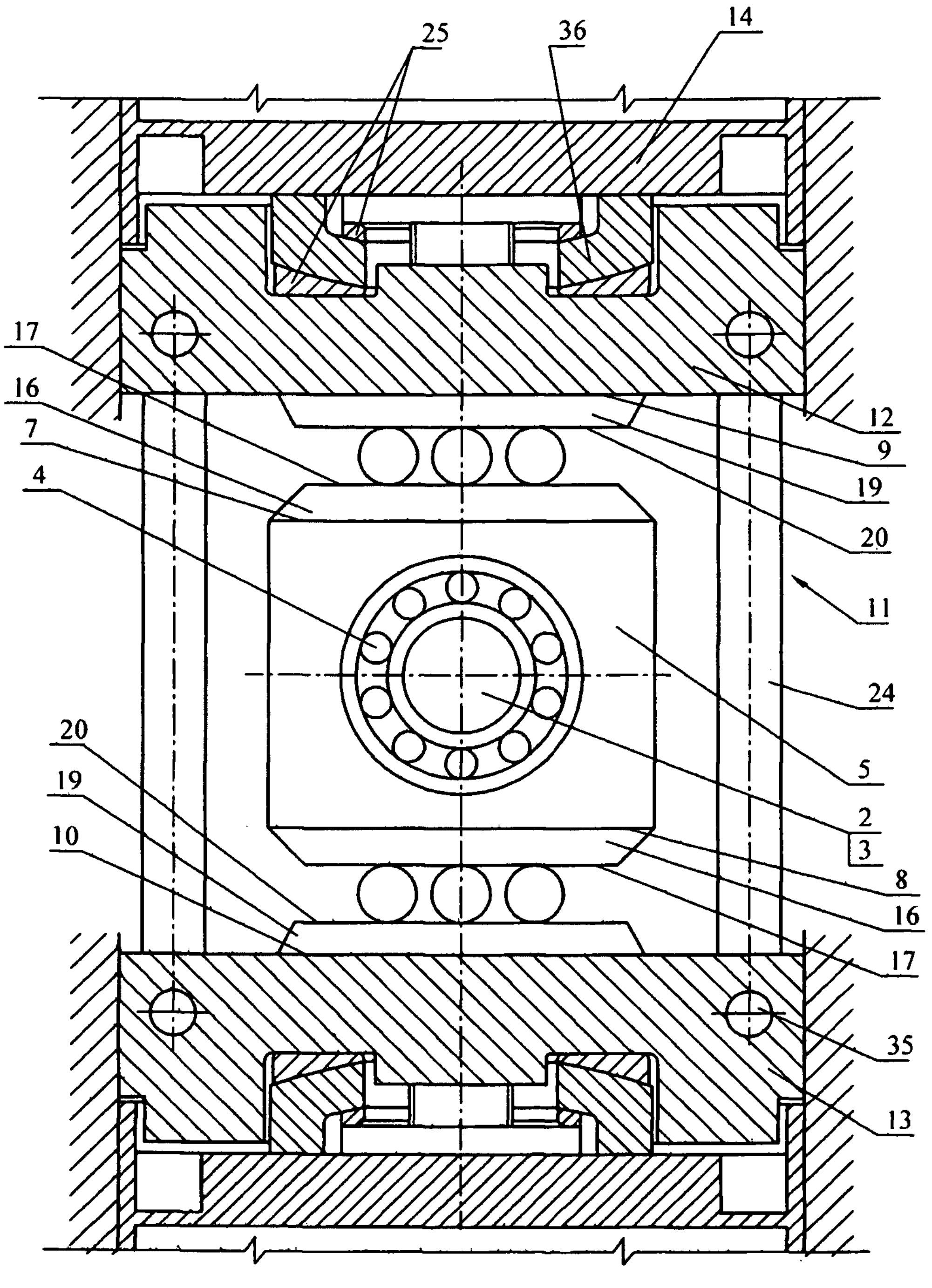
FIG. 1 shows a double-cylinder variant of the crank-and-rocker machine.
Figure 2:
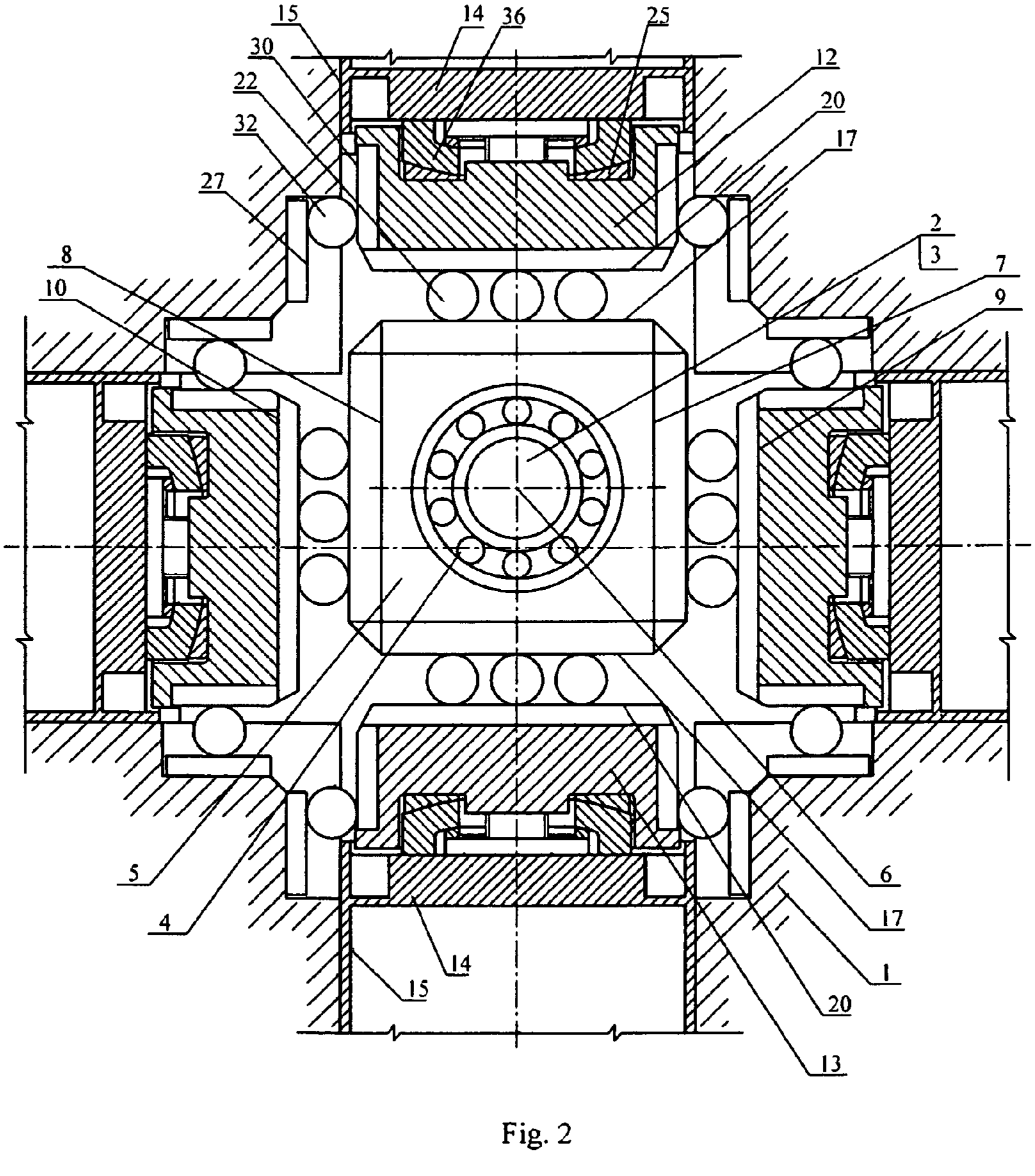
FIG. 2 shows a four-cylinder variant of the machine.
Figure 3:
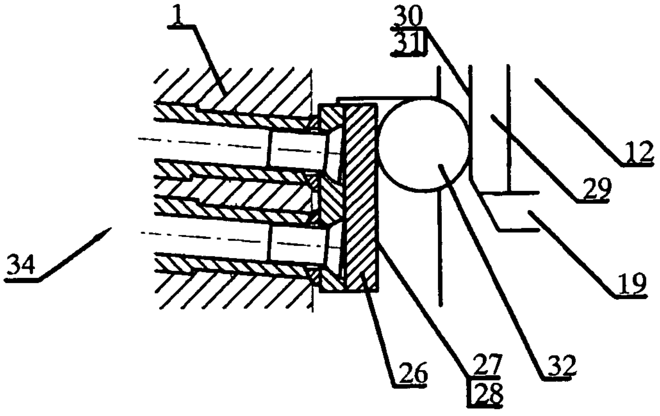
FIG. 3 shows a variant of the mechanism for adjusting the spatial position of support elements.
Figure 4:
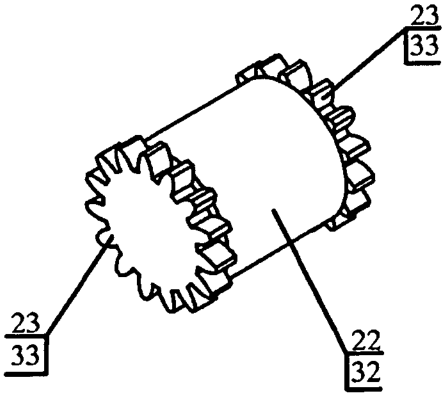
FIG. 4 shows the view of support rollers with synchronizing pinions.
Figure 5:
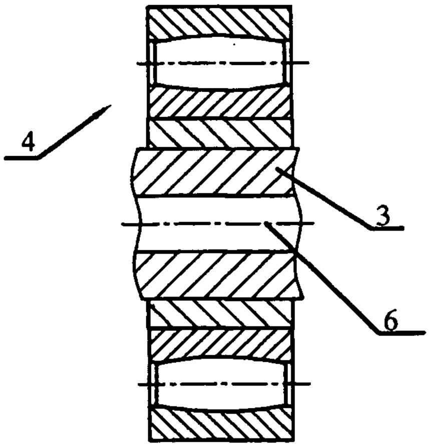
FIG. 5 shows the crankpin bearing assembly.
Figure 6:
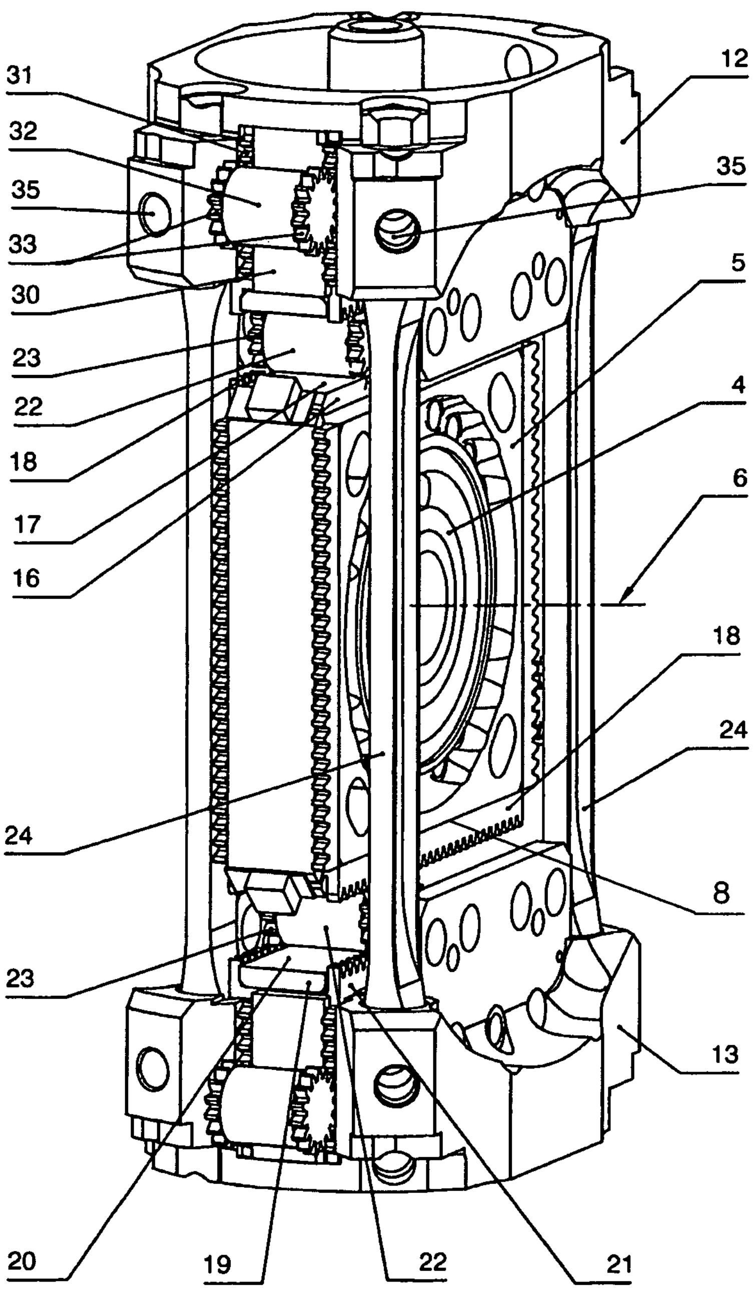
FIG. 6 shows a 3D view of the mechanism assembly.
Figure 7:
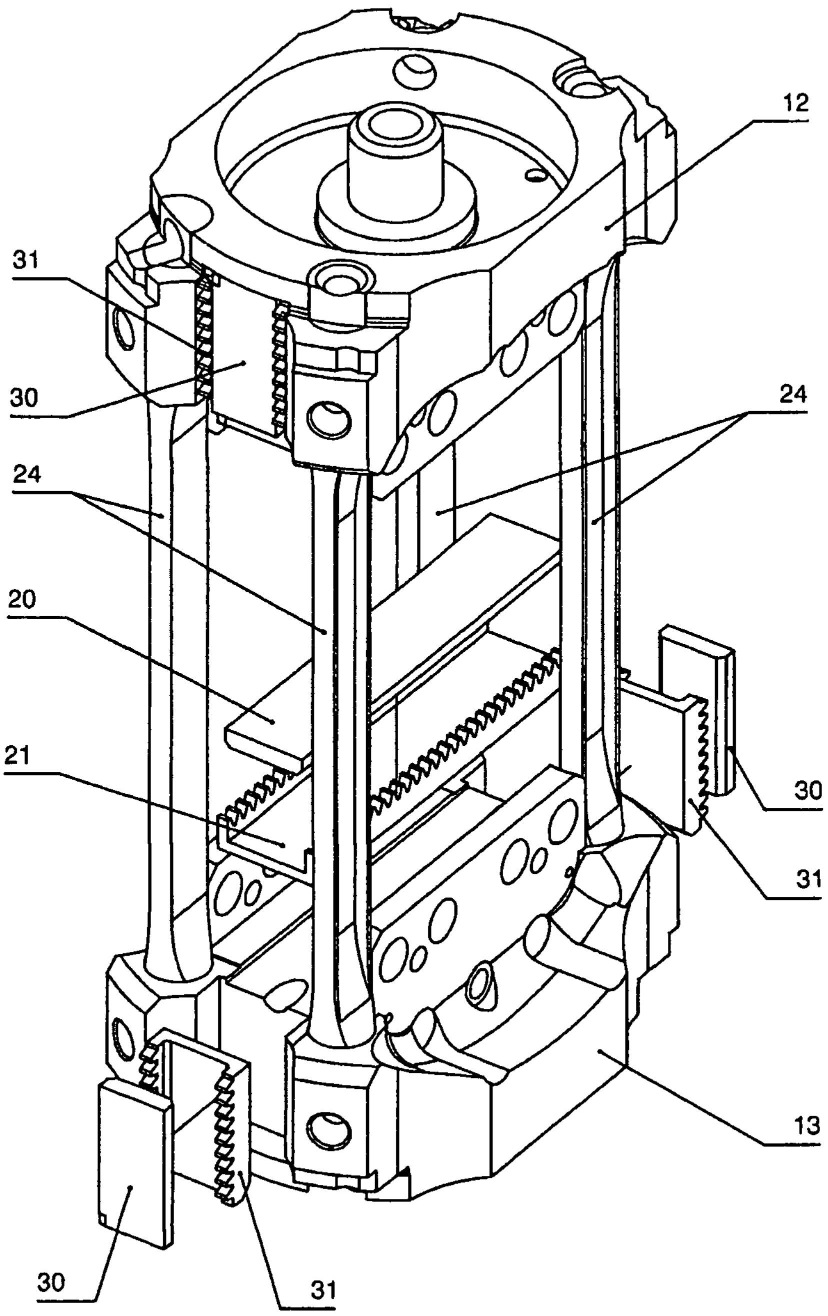
FIG. 7 shows the same, the mechanism with elements.

The described machine comprises housing 1, which accommodates crankshaft 2 with crank 3, mounting, through bearing 4, slide block 5 (slider). Work surfaces 7 and 8 of slide block 5 being opposite relative to rotational axis 6 of crankpin bearing 4 interact with respective work surfaces 9 and 10 of rocker 11, which are arranged on parts 12 and 13 located opposite to axis 6. Therewith, one of the parts, for example 12, is linked to respective piston 14 reciprocating inside cylinder 15 secured to machine housing 1. In a double-cylinder variant with opposed cylinders 15 each part, 12 and 13, is linked to respective piston 14.

Work surfaces 7 and 8 of slide block 5 bear operating support elements with contact surfaces 17 and toothed racks 18, while work surfaces 9 and 10 of rocker 11 bear operating support elements 19 with contact surfaces 20 and toothed racks 21. The space between contact surfaces 17 and 20 accommodates support rollers 22 equipped with synchronizing pinions 23 engaged with racks 18 and 21.

Thereat, the length of contact surface 17, when rollers 22 are used in the interface, is always equal to the length of contact surface 20. As the length of the contact surface in the interface is determined as a distance in the slide block travel plane between the extreme points of the surface area translating the force action in the slide block-rocker couple, in the described interface the length of contact surfaces 17 and 20 interacting through rollers 22 is always determined as a sum of the maximum travel of roller 22 between the extreme points and the distance between the rotational axes of extreme rollers 22 within one interface.

Opposite parts 12 and 13 of the rocker are interconnected by longitudinal connecting elements 24, therewith the said coupling is made so as to limit the travel of part 12 relative to part 13 towards the direction opposite to the rotational axis of shaft 2 along rocker 11 reciprocation. This limitation is required for ensuring the desired distance between contact surfaces 19 of operating support elements 12 and 13 of rocker 11 during the machine operation. Thereat, preload or interference is created in the direction of rocker 11 reciprocation between surfaces 17 and 20 of operating support elements 16 and 19 and rollers 22.

Piston 14 and, for example, part 12 of rocker 11 are interconnected by means of a hinge assembly incorporating, as a minimum, flat hinge 25, enabling piston 14 to self-align along cylinder 15 surface by traveling relative to rocker 11 in any direction in the plane crossing the longitudinal axis of cylinder 15. Hinge 25 with the said degrees of freedom may be made as a bayonet coupling with a radial clearance in the joint.

Housing 1 bears lateral support elements 26 with contact surfaces 27 equipped with toothed racks 28, and the respective rocker parts bear lateral support elements 29 with contact surfaces 30 provided with toothed racks 31. Accommodated in-between contact surfaces 27 and 30 are rollers 32 provided with synchronizing toothed wheels 33, which are engaged with toothed racks 28 and 31. Lateral support elements 26 secured to housing 1 are provided with mechanism 34 which provides adjustment of their spatial position. Mechanism 34 provides creation of a pre-interference in interacting contact surfaces 27 and 30 and rollers 32 as well as correction of contacting surfaces 27 and 30 relative to the trajectory of rocker 11 reciprocation.

Connecting elements 24 may be made as one piece with opposite parts 12 and 13 of rocker 11 or as separate links connected to parts 12 and 13, for example, with studs 35.

The operating support element, for example 19, may be equipped with a mechanism (not shown in the diagrams) providing for adjustment of its spatial position to create, for example, a preload in the place of contact of rollers 22 with contact surfaces 17 and 20 of operating support elements 16 and 19.

The hinge assembly which connects piston 14 with rocker 11 may be additionally equipped with spherical hinge 36 enabling piston 14 to change the tilt angle of its longitudinal axis relative to the direction of rocker 11 reciprocation.

The described machine operates as follows. Reciprocation of pistons 14 is converted into rotation of shaft 2 by means of a rocker mechanism comprising rocker 11 with parts 12 and 13 interconnected by elements 24 and slide block 5. Thereat, the assemblies with lateral support elements 26 and 29 take up the reactive torque occurring in the course of the machine operation. Since the action of the reactive torque is translated to housing 1 exactly through rocker 11, the inner surface of cylinder 15 does not perform the power functions of translating the lateral loads to housing 1, and piston 14 is self-aligned along cylinder 15 inner surface, irrespective of mechanical and thermal deformations of the whole mechanism and housing 1 or accuracy of mechanism parts positioning relative to housing 1. This solution is especially necessary if an adjustment assembly, for example, mechanism 34, is integrated into the structure, and in combination with bearing 4 used as a crankpin one and possessing certain degrees of freedom as to the rocking angle and in axial direction (SKF CARB toroidal bearings), it enables rocker 11 to occupy any spatial position relative to housing 1 assigned to it during assembly, which also does not depend on deformations or accuracy of crankshaft 2 manufacture. The machine essentially comprises crankshaft 2 assembly, rocker 11 assembly interacting with housing 1, and a cylinder-piston group assembly. Deformations of parts in each of the said assemblies or inaccuracy in their manufacture do not affect the character of interaction of elements in adjacent assemblies. And each assembly performs the functions it best suits.

As the length of contact surfaces of both operating and lateral support elements is minimal, the machine dimensions are also minimal in all directions. Essentially, in the course of the described machine operation slide block 5 in its extreme positions goes beyond the dimensions of operating support elements 19, passing in-between connecting elements 24. With the rocker mechanism designed this way, rocker 11 represents a spatial structure with maximum stiffness, which is capable of ensuring reliable operation of the movable interface at a minimum weight.

The capability of creating a pre-interference in the contact assemblies of rocker 11, slide block 5 and housing 1 makes it possible to preclude impacts of rollers 22 and 32 against the respective contact surfaces and to extend the machine life. Therewith, the interference value varies depending on the machine operating modes, in particular, on the rotational frequency of shaft 2, which determines the value of inertial force drawing parts 12 and 13 of rocker 11 apart and decreasing the pre-interference in the contact assembly of rocker 11 and block 5. The minimum pre-interference value during the machine assembly corresponds to the condition of taking up the clearance in the interface.

When manufacturing rocker 11 as one piece with its parts 12 and 13, rocker 11 may be assembled with block 5 using additional fixtures (not shown in the drawings), for example, by elastic or thermal deformation of connecting elements 24 prior to assembly and rolling in rollers 22 in-between support elements 16 and 19. Thereat, pre-interference is created by observing the desired distance between contact surfaces 20, a lesser overall dimension between surfaces 17 and two diameters of rollers 22.

The same condition is observed when assembling configurations with separately manufactured connecting elements and parts 12 and 13.

Mechanism 36 can be used with both configuration variants of rocker 11 as well, which make is possible to preload the contact interface due to displacement of operating element 19 towards rollers 32 and operating support element 16. Therewith, correction of the position of contact surface 20 plane is possible, which provides for leveling errors during fabrication of the rocker group parts.

Should the described machine be used as a two-stroke internal combustion engine, the effect of compensation of gas forces at the account of inertial ones appears. With the inertial load increased, the crankpin bearing (bearing of connecting rod big end) appears to be the bottleneck in traditional engines. If during combustion it is exposed to the difference between the gas and inertial forces, then at other piston dead points it takes up the maximum inertial load. In four-stroke engines it occurs at the end of the expansion, exhaust and suction strokes. In the case, when two pistons are installed at the opposite ends of an adding mechanism, which functions in the described engine are performed by rocker 11, and when running a two-stroke working process in cylinders 15, then in each extreme position of pistons 14 bearing 14 will be subjected to the difference between the gas force from combustion of the load in one cylinder 15 and inertial force from displacing masses of two pistons 14 and rocker 11. I.e. crankpin bearing 4 in the engine of the described configuration is not exposed to peak values of the loads characteristic of classic configuration engines.

Besides, the problem of the crankpin bearing in the connecting rod mechanism should be given attention. The relative speed of interacting surfaces of the connecting rod bearing is variable due to swinging angular displacement of the connecting rod relative to the crank axis. This results in destabilization of oil wedge when fluid lubrication is used and in the cage failure when a roller bearing is used.

In the described mechanism bearing 4 is not exposed to such effect and operates in much better conditions as compared to connecting rod mechanisms, while taking up a load averaged during the cycle, i.e. the load practically corresponding to the mean effective pressure.

INDUSTRIAL APPLICABILITY

Thus, the design of the converting mechanism of the described machine and the opposed piston configuration make is possible to considerably extend the limits of its operation as regards the shaft rotational frequency and the values of operational loads acting on the piston while ensuring an acceptable life of the machine.

In the described machine, only one sliding couple exists: piston ring-cylinder. The other interacting couples are subjected to rolling friction only, which considerably decreases mechanical losses during the machine operation, especially when it is used as an internal combustion engine. Thereat, no oil pressure delivery is required. The latter circumstance makes the engine starting substantially easier, especially in extreme Northern environment and after air delivery of combat vehicles.

The configuration with two pairs of cylinders makes it possible to use just one crank for driving four pistons, which considerably improves specific weight and size parameters of the machine.

The invention claimed is:

1. A crank-and-rocker piston machine comprising a housing accommodating a crankshaft with at least one crank mounting, through a bearing, a slide block, its opposite work surfaces interacting with the respective work surfaces located on the rocker parts being opposite relative to the crankpin bearing rotation axis, where the rocker is linked to at least one piston reciprocating inside a cylinder secured to the machine housing, while the machine is provided with lateral support elements with contact surfaces which translate to the housing the reactive torque, where the interacting work surfaces of the slide block and rocker bear operating support elements with contact surfaces and toothed racks, where the space between the contact surfaces of the operating support elements of the slide block and rocker accommodates support rollers provided with synchronizing toothed wheels which are engaged with the racks of the operating support elements of both the rocker and slide block, where the opposite parts of the rocker which surfaces bear the operating support elements are interconnected by means of longitudinal connecting elements, the length of the contact surface of the slide block support element being equal to the length of the contact surface of the rocker support element and the length of the contact surface to be determined as a distance in the slide block motion plane between the extreme points of the surface area translating the force action in the slide block-rocker couple, incorporating a rocker which differs in that the piston and rocker are interconnected by means of a hinge assembly, accommodating at least a flat hinge, to allow the piston self-alignment along cylinder surface due to travel in any direction relative to the rocker in the plane crossing the cylinder longitudinal axis; lateral support elements mounted to interacting parts of the housing and rocker, crankpin bearing providing for angular travel of the slide block in the plane crossing the shaft rotational axis and for slide block travel along the shaft rotational axis to allow self-alignment of the slide block relative to the crank, where the coupling between opposite parts of the rocker and connecting elements is made so as to limit travel of one rocker part relative to its opposite part towards the direction opposite to the shaft rotational axis and along the rocker reciprocation to ensure the desired distance between the contact surfaces of the rocker operating support elements during the machine operation, while making the contact surfaces of operating support elements and rollers preloaded.

2. A machine of claim 1, wherein the connecting elements are made as one piece with opposite parts of the rocker which bear the operating support elements.

3. A machine of claim 1, wherein the connecting elements are made as separate links connected to opposite parts of the rocker which bear the operating support elements.

4. A machine of claim 1, wherein at least one support element is provided with a mechanism for adjusting its spatial position to make, as a minimum, the place of contact between the support rollers and contact surfaces of operating support elements preloaded.

5. A machine of claim 1, wherein the lateral support elements are provided with toothed racks and the space between the contact surfaces of lateral support elements accommodates support rollers equipped with synchronizing toothed wheels engaged with the toothed racks of lateral support elements, where at least one lateral support element, for example that installed on the housing, is provided with a mechanism to adjust its spatial position to ensure, at a minimum, a pre-interference in the interacting contact surfaces of the support elements and rollers.

6. A machine of claim 1, wherein the hinge assembly is additionally equipped with a spherical hinge enabling the piston to change the tilt angle of its longitudinal axis relative to the direction of the rocker reciprocation.

7. A machine of claim 1, wherein it is made double-cylinder, where each opposite part of the rocker is connected to the piston.

8. A machine of claim 7, wherein it is made four-cylinder, with intersecting axes of cylinder pairs, while the slide block is provided with two pairs of opposite work surfaces.

* * * * *